(12) United States Patent
Nomichi et al.

(10) Patent No.: US 8,245,730 B2
(45) Date of Patent: Aug. 21, 2012

(54) SOLENOID VALVE DEVICE

(75) Inventors: Kaoru Nomichi, Ono (JP); Seiji Ishii, Ono (JP); Makoto Ninomiya, Kobe (JP)

(73) Assignee: Kawasaki Jukogyo Kabushiki Kaisha, Kobe-shi (JP)

( * ) Notice: Subject to any disclaimer, the term of this patent is extended or adjusted under 35 U.S.C. 154(b) by 355 days.

(21) Appl. No.: 11/719,904

(22) PCT Filed: Nov. 22, 2004

(86) PCT No.: PCT/JP2004/017347
§ 371 (c)(1),
(2), (4) Date: Nov. 18, 2008

(87) PCT Pub. No.: WO2006/054362
PCT Pub. Date: May 26, 2006

(65) Prior Publication Data
US 2009/0152485 A1    Jun. 18, 2009

(51) Int. Cl.
*F16K 39/02*    (2006.01)
(52) U.S. Cl. ............... 137/630.15; 251/129.01; 335/57
(58) Field of Classification Search .......... 137/630, 137/630.15; 251/129.01, 129.1, 129.21, 251/366, 367, 129.15; 335/57; 174/84 R
See application file for complete search history.

(56) References Cited

U.S. PATENT DOCUMENTS

| | | | | |
|---|---|---|---|---|
| 3,171,887 A | * | 3/1965 | Cross et al. | 174/355 |
| 4,387,739 A | * | 6/1983 | Schaming | 251/129.15 |
| 4,595,724 A | * | 6/1986 | Koblitz | 174/84 R |
| 4,890,815 A | * | 1/1990 | Hascher-Reichl et al. | 251/129.15 |
| 5,192,048 A | * | 3/1993 | Wakeman | 251/129.16 |
| 5,244,180 A | * | 9/1993 | Wakeman et al. | 251/129.16 |

(Continued)

FOREIGN PATENT DOCUMENTS

GB    1 324 011 A    7/1973

(Continued)

OTHER PUBLICATIONS

International Search Report for PCT/JP2004/017347, mailed Mar. 15, 2005.

(Continued)

*Primary Examiner* — Craig Schneider
*Assistant Examiner* — Craig J Price
(74) *Attorney, Agent, or Firm* — Marshall, Gerstein & Borun LLP (57) ABSTRACT

Electric power is supplied to a coil (17) to drive a valve (16) for displacement by a magnetic action, thereby adjusting the opening of a valve path (43). The electric power for thus driving the valve (16) is supplied to the coil (17) through an electric conductor wire (18). The electric conductor wire (18) extends from a portion of a housing (15) that is exposed from a tank (11) to a portion of the housing (15) that accommodates the coil (17) therein. Thus, the housing (15) holds the electric conductor wire (18) as extending inside the housing (15). Since the electric conductor wire (18) is thus held as extending inside the housing (15), the electric conductor wire (18) is protected against vibration and impact given thereto from the outside. Thus, the electric conductor wire (18) has enhanced reliability in terms of resistance to vibration and impact. With the electric conductor wire (18) thus positioned within the housing (15), the housing (15) can house the electric conductor wire (18) neatly. Thus, the present invention can provide a highly reliable electromagnetic valve device which can be reduced in size and simplified in structure.

5 Claims, 4 Drawing Sheets

U.S. PATENT DOCUMENTS

| | | | | |
|---|---|---|---|---|
| 5,315,278 A | * | 5/1994 | Demere et al. | 251/129.15 |
| 5,365,020 A | * | 11/1994 | Vallauri et al. | 174/84 R |
| 5,452,738 A | * | 9/1995 | Borland et al. | 137/265 |
| 5,562,117 A | * | 10/1996 | Borland et al. | 137/630.15 |
| 5,899,194 A | | 5/1999 | Iwatsuki et al. | |
| 5,939,811 A | * | 8/1999 | Enomoto et al. | 310/12.27 |
| 6,119,966 A | * | 9/2000 | Wagner et al. | 251/129.15 |
| 6,452,099 B1 | * | 9/2002 | Miller et al. | 174/652 |
| 6,575,194 B1 | * | 6/2003 | Miller et al. | 137/560 |
| 6,688,578 B1 | * | 2/2004 | Nussio et al. | 251/129.15 |
| 2003/0066836 A1 | * | 4/2003 | Sakaguchi et al. | 220/581 |
| 2003/0151018 A1 | * | 8/2003 | Teshima et al. | 251/332 |
| 2008/0308759 A1 | * | 12/2008 | Narita et al. | 251/129.15 |
| 2009/0236551 A1 | * | 9/2009 | Nomichi et al. | 251/129.15 |

FOREIGN PATENT DOCUMENTS

| | | |
|---|---|---|
| JP | 11-31616 A | 5/1989 |
| JP | 4-129979 | 11/1992 |
| JP | 5-96652 | 12/1993 |
| JP | 6-508422 T | 9/1994 |
| JP | 09-210239 A | 8/1997 |
| JP | 11-031616 A | 2/1999 |
| JP | 11-176633 A | 7/1999 |
| JP | 2000-193123 A | 7/2000 |
| JP | 2002-235864 A | 8/2002 |
| JP | 2003-240148 A | 8/2003 |
| WO | WO-02/01100 A2 | 1/2002 |

OTHER PUBLICATIONS

Annex to the European Search Report on European Patent Application No. EP 04 82 2568, dated Apr. 8, 2010.

* cited by examiner

SOLENOID VALVE DEVICE

TECHNICAL FIELD

The present invention relates to an electromagnetic valve device for use in pressure equipment such as high-pressure gas equipment.

BACKGROUND ART

Figure 4:
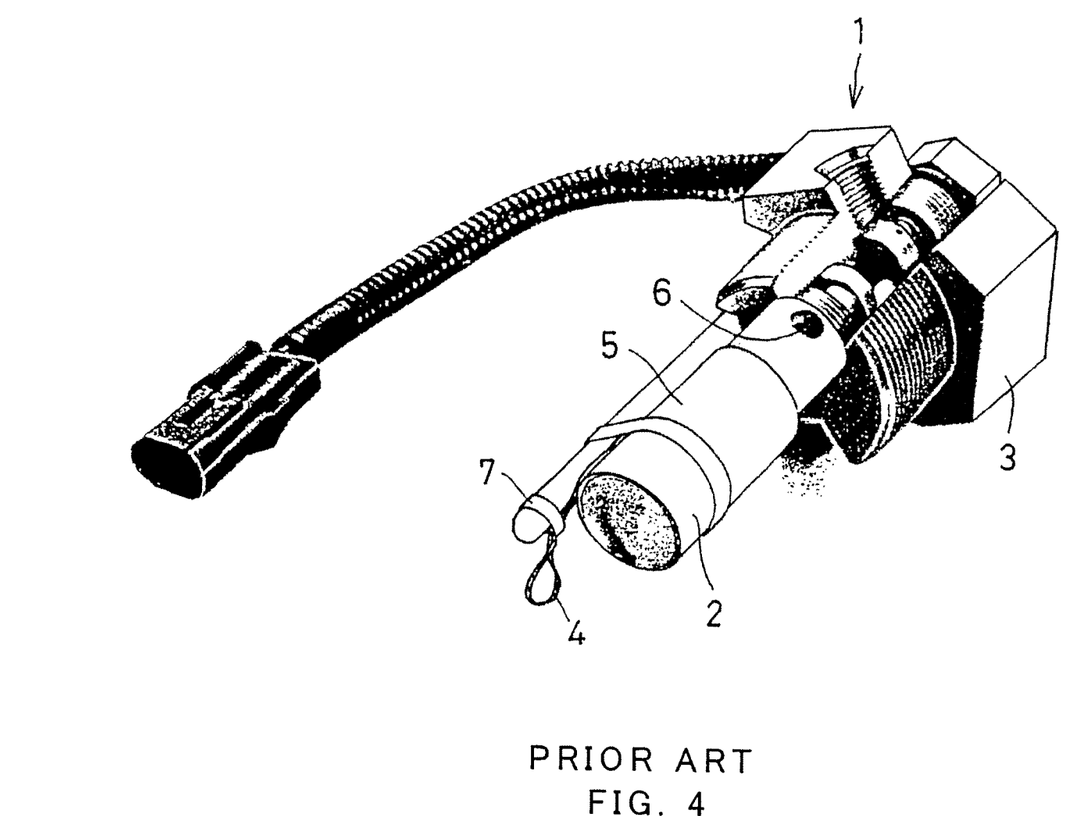
FIG. 4 is a perspective view showing an electromagnetic valve according to the prior art.

FIG. 4 is a perspective view showing an electromagnetic valve 1 according to prior art. Such an electromagnetic valve 1 is shown in FIG. 4 of patent document 1 or in non-patent document 1. The electromagnetic valve 1 is fitted on a tank for natural gas fueled automobiles by bringing its second axial end (opposite axial end) 3 into thread engagement with an opening portion of the tank with a portion of the valve on the side closer to its first axial end (one axial end) 2 inserted into the tank. The electromagnetic valve 1 is configured so as to be on-off controlled by controlling supply of electric power to a coil and hence has a lead wire 4 for supplying electric power to the coil. The lead wire 4 is left exposed on the outside of a housing 5 accommodating the valve and the like therein. The electromagnetic valve 1 is formed with a primary port 6 for intake of gas from the tank by forming a radially outwardly oriented opening in an axially intermediate portion thereof. Such an electromagnetic valve 1 is called "in-tank valve" or the like. For example, an in-tank valve manufactured by Superior Co. of the United States is known.

Patent document 1: Japanese Granted Patent No. 2757978
Non-patent document 1: Valve Pamphlet concerning Solenoid-operated Valves published by Hamai Industries Limited p. 34 (intank type solenoid valve manufactured by Superior Valve Co.)

DISCLOSURE OF INVENTION

Problems to be Solved by Invention

The prior-art electromagnetic valve 1 has the lead wire 4 exposed within the tank. Though the lead wire 4 is tied at its middle portion by means of a tying member 7, the lead wire 4 is displaced by vibration or the like when vibration, impact or the like is exerted thereon from the outside. Such displacement of the lead wire 4 lowers the reliability of the electromagnetic valve 1. Further, with the lead wire 4 in an exposed condition, the portion of the electromagnetic valve 1 to be inserted into the tank becomes larger in dimensions, while at the same time the assembling operation becomes complicated. Also, with the arrangement having the primary port 6 opening radially outwardly, the electromagnetic valve 1 has to be uselessly inserted into the tank up to a position at which the primary port 6 is open to the internal space of the tank. This also results in the portion of the electromagnetic valve 1 to be inserted into the tank becoming larger in dimensions.

Means for Solving Problems

An object of the present invention is to provide a highly reliable electromagnetic valve device which can be reduced in size and simplified in structure.

The present invention provides an electromagnetic valve device to be incorporated in pressure equipment handling a pressure fluid with a portion thereof exposed from the pressure equipment, the electromagnetic valve device comprising:

a housing formed with a primary port and a secondary port which are connected to each other through a valve path;

a displaceable valve configured to vary an opening of the valve path by displacement thereof;

electromagnetic drive means operative to drive the valve for displacement by a magnetic action caused by utilization of electric power; and electric conductor means for supplying electric power to the electromagnetic drive means, the electric conductor means being held by the housing so as to extend inside the housing from a portion of the housing that is exposed from the pressure equipment to a portion of the housing that accommodates the electromagnetic drive means therein.

According to the present invention, electric power is supplied to the electromagnetic drive means in order to drive the valve for displacement by a magnetic action, thereby adjusting the opening of the valve path. The electric power for thus driving the valve is supplied to the electromagnetic drive means by the electric conductor means. The electric conductor means extends from the portion of the housing that is exposed from the pressure equipment to the portion of the housing that accommodates the electromagnetic drive means therein and is held by the housing so as to extend inside the housing. Since the electric conductor means is held by the housing so as to extend inside the housing, the electric conductor means is protected against vibration and impact exerted thereon from the outside. Thus, the electric conductor means can be imparted with high reliability in terms of resistance to vibration and impact. Also, since the electric conductor means is positioned within the housing, the housing can house the electric conductor means neatly.

The electromagnetic valve device according to the present invention may have an arrangement wherein:

the housing comprises a plurality of housing sections joined together;

the electric conductor means comprises electric conductor pieces connected to each other, each of which is held by a respective one of the housing sections; and the electric conductor pieces are connected to each other with an operation of joining the housing sections together.

According to the present invention, the electric conductor means has the plural electric conductor pieces each held by a respective one of the housing sections. With joining of the housing sections together, the electric conductor pieces become connected to each other. Thus, the housing comprising the housing sections joined together can be provided with the electric conductor means without need to perform the operation of connecting the electric conductor pieces to each other separately from the operation of joining the housing sections together.

The electromagnetic valve device according to the present invention may have an arrangement wherein:

a pair of such electric conductor pieces to be connected to each other include a first electric conductor piece having a pin-shaped end portion and a second electric conductor piece having a socket-shaped end portion; and the pin-shaped end portion of the first electric conductor piece is caught elastically by the socket-shaped end portion of the second electric conductor piece when the pin-shaped end portion is inserted into the socket-shaped end portion.

According to the present invention, by inserting the pin-shaped end portion of each electric conductor piece into the socket portion of the counterpart electric conductor piece, the pin-shaped end portion is caught elastically by the socket-shaped portion, so that the electric conductor pieces are connected to each other. Since the connection between the electric conductor pieces can be made in this way, it is possible to realize the electric conductor means which can be formed by connecting the electric conductor pieces to each other with joining of the housing sections together.

The electromagnetic valve device according to the present invention may include seal means intervening between the housing and the electric conductor means.

According to the present invention, the seal means is provided between the housing and the electric conductor means. The provision of the seal means makes it easy to prevent the fluid from leaking through between the housing and the electric conductor means.

The electromagnetic valve device according to the present invention may have an arrangement wherein:

at least the housing, the valve and the electromagnetic drive means are coaxially arranged along a predetermined reference axis; and the primary port is formed at an axial end portion of the housing that is located in directions along the reference axis and positioned inside the pressure equipment.

According to the present invention, the primary port is formed at the axial end portion of the housing that is located inside the pressure equipment along the reference axis. With the primary port thus formed at the end portion of the housing, it is possible to reduce limitations on designing to open the primary port inside the pressure equipment as compared with cases where the primary port is formed at an axially intermediate portion of the housing so as to open in a direction intersecting the reference axis.

Advantage of Invention

According to the present invention, it is possible to enhance the reliability of the electric conductor means, hence, the reliability of the electromagnetic valve by positioning the electric conductor means to extend inside the housing. With the electric conductor means thus housed within the housing, the electromagnetic valve device can be reduced in size and simplified in structure, hence, can be rendered compact. Thus, the present invention can provide such a highly reliable ad compact electromagnetic valve device.

According to the present invention, it is possible to provide the electric conductor means extending inside the housing by joining the housing sections together. Thus, the electromagnetic valve device having improved assemblability can be realized which is small in size and simplified in structure.

According to the present invention, by butt-joining the housing sections together, the pin-shaped end portion is inserted into the socket-shaped end portion, thereby connecting the electric conductor pieces to each other. Therefore, such a simple operation of joining the housing sections together makes it possible to connect the electric conductor pieces to each other at the same time, thus ensuring improved assemblability.

Also, the present invention can realize an advantageous electromagnetic valve device which is capable of easily preventing the fluid from leaking between the housing and the electric conductor means.

Further, the present invention makes it possible to render the electromagnetic valve device compact by reducing limitations on designing to open the primary port inside the pressure equipment.

DESCRIPTION OF REFERENCE CHARACTERS

10 . . . electromagnetic on-off valve
11 . . . tank
15 . . . housing
16 . . . valve
17 . . . coil
18 . . . driving coil spring
19 . . . electric conductor wire
44 . . . main valve
45 . . . pilot valve
75 . . . first electric conductor piece (terminal pin)
76 . . . second electric conductor piece
88 . . . lead wire
89 . . . terminal socket

BEST MODE FOR CARRYING OUT THE INVENTION

Figure 1:
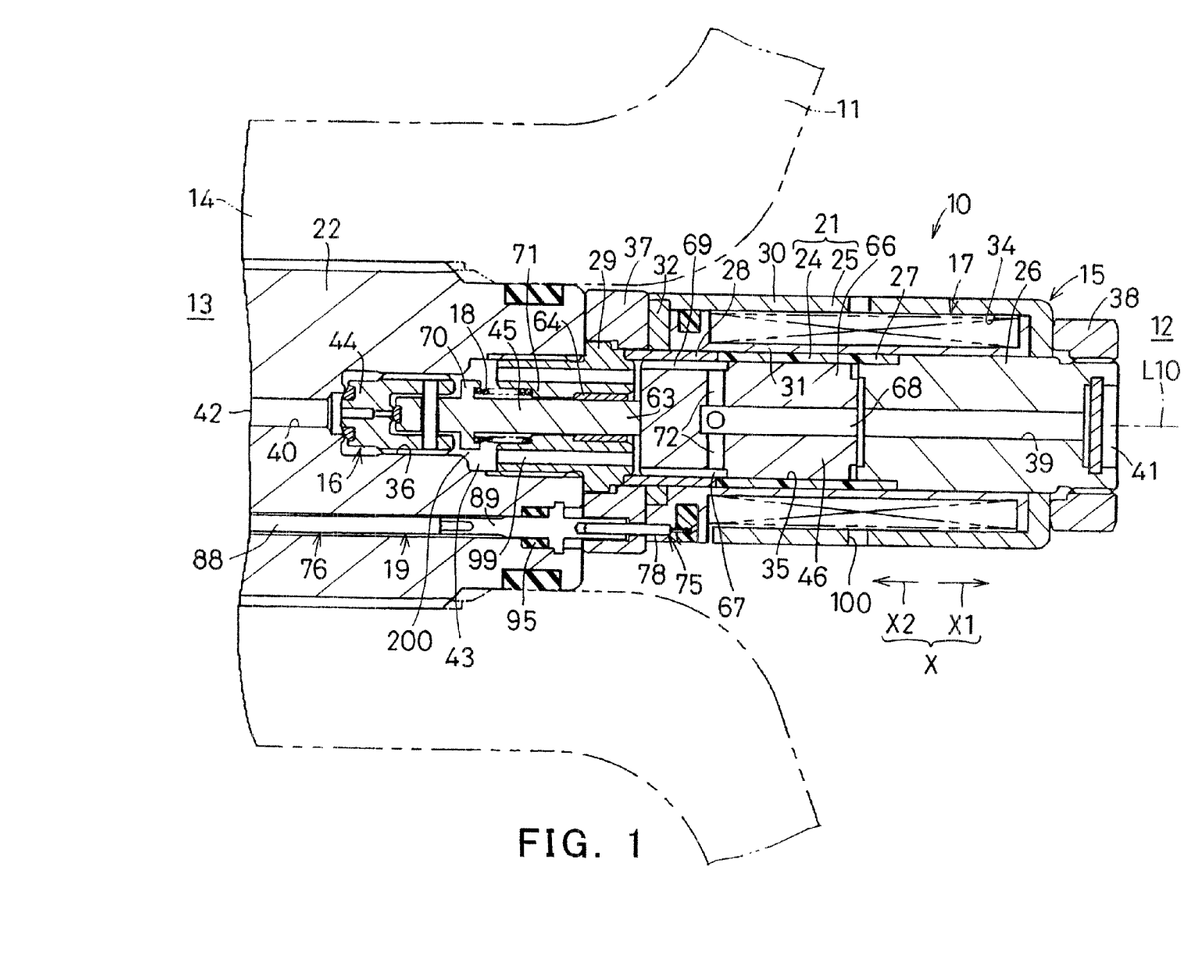
FIG. 1 is a cross-sectional view showing an electromagnetic on-off valve according to an embodiment of the present invention.

FIG. 1 is a cross-sectional view showing an electromagnetic on-off valve 10 according to an embodiment of the present invention. The electromagnetic on-off valve 10 is an electromagnetic valve device to be provided on pressure equipment handling gas as a fluid. The pressure equipment is a pressure vessel for example, more specifically, a high-pressure gas tank (hereinafter will be referred to as "tank" simply) 11. The electromagnetic on-off valve 10 is suitable particularly for use in the tank 11 containing flammable gas, such as a fuel tank for natural gas fueled automobiles.

The electromagnetic on-off valve 10 controls output of gas from an internal space 12 of the tank 11 (hereinafter will be referred to as "tank internal space") to an external space 13 of the tank 11 (hereinafter will be referred to as "tank external space") having a lower pressure than the tank internal space 12. (For example, such a tank external space is a loading space having a throttling function like a reducing valve or a throttling valve.) Specifically, the electromagnetic on-off valve 10 is fitted in an opening portion 14 of the tank 11 to on/off-control the opening portion 14 thereby switching between a condition allowing output of gas and a condition stopping output of gas.

The electromagnetic on-off valve 10 includes a housing 15, valve 16, coil 17, electric conductor wire 19, and driving spring member 18. The housing 15 holds therein the valve 16, coil 17, electric conductor wire 19 and driving spring member 18 to form the electromagnetic on-off valve 10. The electromagnetic on-off valve 10 has a predetermined reference axis L10. A portion of the electromagnetic valve device 10 that is located on side X1 in directions X1 and X2 parallel with the reference axis L10 (hereinafter will be referred to as "axial directions") is positioned in the tank internal space 12, while a portion of the electromagnetic valve device 10 that is located on side X2 in the axial directions X1 and X2 is exposed to the tank external space 13.

The housing 15 comprises plural housing sections joined together. In the present embodiment, first and second housing sections 21 and 22 are joined together to form the housing 15. The housing 15 has an axis coinciding with the reference axis L10. The first housing section 21 is located on side X1 in the axial directions and the second housing section 22 located on side X2 in the axial directions.

The first housing section 21 has an insert member 24 and a casing member 25. The insert member 24 has a fixed magnetic pole member 26, non-magnetic guide member 27, magnetic guide member 28 and coupling cylinder member 29. The fixed magnetic pole member 26 comprises a ferromagnetic material such as steel for example and is shaped generally columnar. The non-magnetic guide member 27 comprises a non-magnetic material and is shaped cylindrical. The magnetic guide member 28 comprises a magnetic material such as steel for example and is shaped cylindrical. The coupling cylinder member 29 is shaped generally cylindrical.

The non-magnetic guide member 27 and the magnetic guide member 28 are substantially equal to each other in inside diameter, outside diameter and thickness. The inside diameter of the magnetic guide member 28 is larger than that of the non-magnetic guide member 27. Each of the non-magnetic guide member 27 and the magnetic guide member 28 has an outside diameter substantially equal to an average outside diameter of each of the fixed magnetic pole member 26 and the coupling cylinder member 29.

The fixed magnetic pole member 26, non-magnetic guide member 26, magnetic guide member 28 and coupling cylinder member 29 are arranged in this order from side X1 to side X2 in the axial directions and mechanically joined together into one piece by adhesion or welding. In this way, the insert member 24 in the form of a bottomed cylinder is formed which defines a first housing recess 35 opening toward the axial direction X2.

The casing member 25 has a solenoid case member 30 and a coil bobbin member 31. The solenoid case member 30 is shaped cylindrical having an inwardly extending flange portion at an end thereof located on side X1 in the axial directions. The coil bobbin member 31 is shaped cylindrical having an outwardly extending flange portion at each of opposite axial ends thereof. The inside diameter of the portion of the solenoid case member 30 other than the flange portion is larger than the outside diameter of the portion of the coil bobbin member 31 other than the flange portions.

The coil bobbin member 31 is inserted into the solenoid case member 30 from side X2 in the axial directions and then a yoke member 32 is fitted into an end portion of the solenoid case member 30 that is located on side X2 in the axial directions in order to prevent the coil bobbin member 31 from coming off. In this way, the solenoid case member 30 and the coil bobbin member 31 are joined together. Thus, the cylindrical casing member 25 is formed. The casing member 25 has a coil chamber 34 defined by the solenoid case member 30 and the coil bobbin member 31. The casing member 25 is fitted over a portion of the insert member 24 extending from the fixed magnetic pole member 26 to the magnetic guide member 28.

The second housing section 22 defines a second housing recess 36 along the reference axis L10, the second housing recess 36 opening toward the axial direction X1. The second housing section 22 has an end portion located on side X1 in the axial directions which has an internally threaded inner peripheral portion.

The coupling cylinder member 29 forming the insert member 24 of the first housing section 21 has a portion located on side X2 in the axial directions which has an externally threaded outer peripheral portion. The coupling cylinder member 29 is brought into thread engagement with the second housing section 22 to couple the insert member 24 of the first housing section 21 to the second housing section 22.

The fixed magnetic pole member 26 forming part of the insert member 24 of the first housing section 21 has an end portion located on side X1 in the axial directions which has an externally threaded outer peripheral portion. With the insert member 24 coupled to the second housing section 22, the casing member 25 is fitted over the insert member 24. An annular spacer 37 made of resin intervenes between the casing member 25 and the second housing section 22, while an internally threaded fixing nut member 38 is brought into thread engagement with the fixed magnetic pole member 26.

By so doing, the casing member 25 and the spacer 37 are fixedly caught between the second housing section 22 and the fixing nut member 38. Thus, the first and second housing sections 21 and 22 are joined together to form the housing 15 defining therein a valve chest space 200 by the first and second housing recesses 35 and 36.

The fixed magnetic pole member 26 forming part of the insert member 24 of the first housing section 21 defines a primary path 39 extending therethrough along the reference axis L10. On the other side, the second housing section 22 defines a secondary path 40 extending therethrough along the reference axis L10. The valve chest space 200 is connected to the tank internal space 12 forming an external space of the housing 15 through the primary path 39 and connected to the tank external space 13 forming the external space of the housing 15 through the secondary path 40.

An opening of the primary path 39 that is open to the tank internal space 12 forms a primary port 41, while an opening of the secondary path 40 that is open to the tank internal space 12 forms a secondary port 42. The valve chest space 200 accommodates therein the valve 16 and the like. With the valve chest space 200 in this condition, a valve path 43 comprising the valve chest space 200 and the primary and secondary paths 39 and 40 is formed. In this way, the housing 15 is formed with the primary and secondary ports 41 and 42 and the valve path 43. The primary and secondary ports 41 and 42 are connected to each other through the valve path 43. Though the secondary port 42 and its periphery are not shown in FIG. 1, reference character "42" designating the secondary port is given to the extremity of the secondary path 40 shown for easy understanding.

Figure 2:
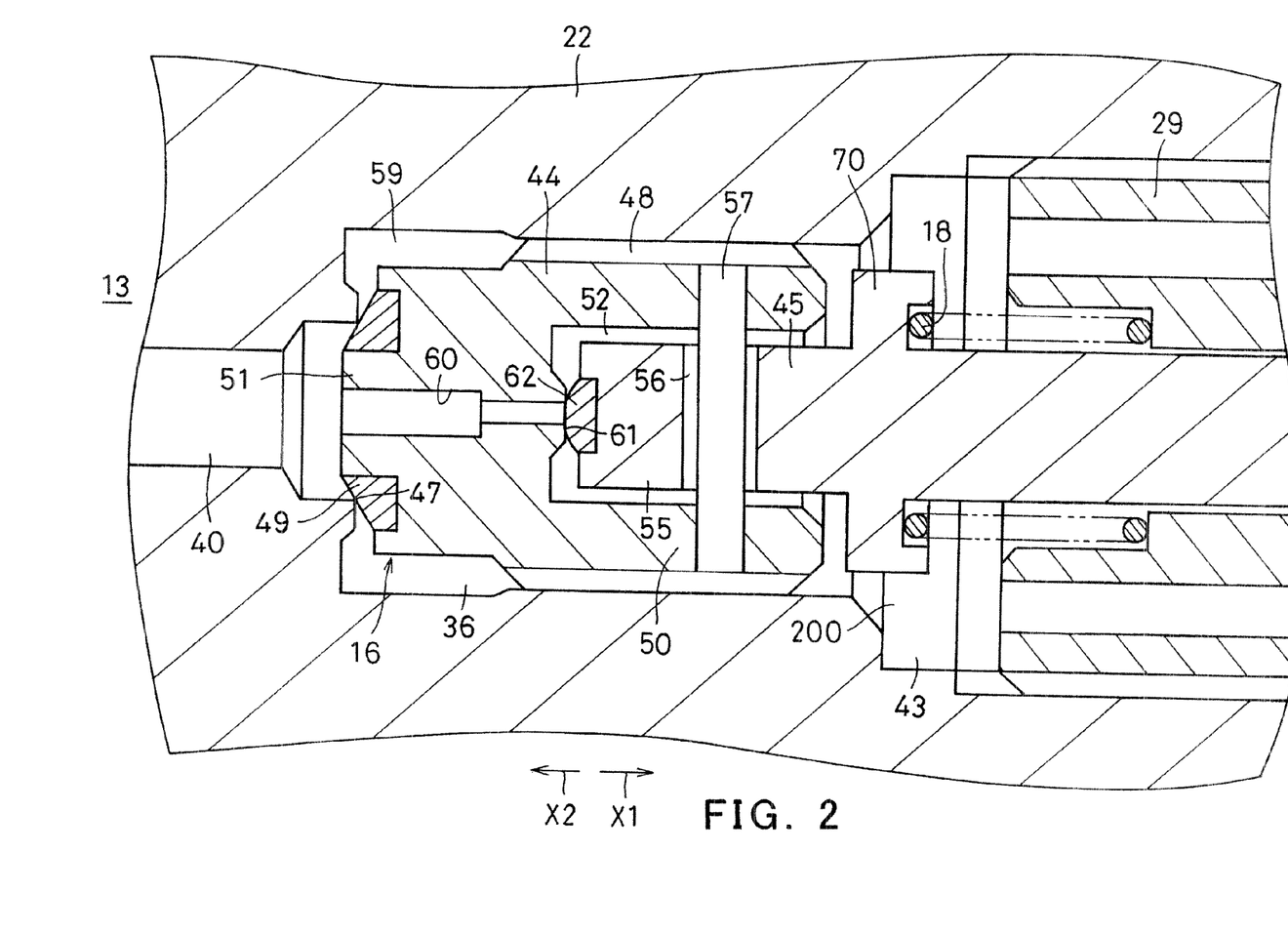
FIG. 2 is an enlarged cross-sectional view showing a valve and its periphery of the electromagnetic on-off valve shown in FIG. 1.

FIG. 2 is an enlarged cross-sectional view of the valve 16 and its periphery shown in FIG. 1. Reference will be made of FIG. 2 together with FIG. 1. The valve 16, which is means for opening and closing the valve path 43, has a main valve 44, pilot valve 45 and a moving core 46. The pilot valve 45 and the moving core 46 are formed integral with each other. The pilot valve 45 and the moving core 46 thus integrated together and the main valve 44 are displaceable relative to each other. Thus, the valve 16 has a two-part structure. The main valve 44, pilot valve 45 and moving core 46 are arranged within the valve chest space 200 coaxially with the housing 15, with their respective axes coinciding with the reference axis L10.

The main valve 44 is shaped generally bottomed cylindrical having a cylindrical portion 50 and a bottom portion 51 closing one end of the cylindrical portion 50. The main valve 44 is fitted in the second housing section 22 with its bottom portion 51 located on side X2 in the axial directions so that the second housing section 22 supports the main valve 51 for displacement in the axial directions X1 and X2.

In the second housing section 22, a main valve seat 47 is formed so as to circumscribe the opening of the secondary path 40 which is open to the valve chest space 200. The main valve 44 is displaceable between a main valve closed position in which a main valve seat portion 49 formed at the bottom portion 51 is pressed on a main valve seat 47 and a main valve open position in which the main valve seat portion 49 is spaced apart from the main valve seat 47 in a main valve opening direction from the main valve closed position toward the main valve open position and in a main valve closing direction from the main valve open position toward the main valve closed position.

The main valve 44 has an outer peripheral portion formed with a dented groove 48 extending therethrough in the axial directions X1 and X2. By utilizing this dented groove 48, a main path 59 is formed between the main valve 44 and the housing 15. When in the main valve closed position, the main valve 44 closes the main path 59 to shut off connection between the main path 59 and the secondary path 40. When in the main valve open position, the main valve 44 opens the main path 59 to establish connection between the main path 59 and the secondary path 40.

Since the main valve opening direction is the same as the axial direction X1, the same reference character X1 will hereinafter be used to designate the main valve opening direction as the case may be. Similarly, since the main valve closing direction is the same as the axial direction X2, the same reference character X2 will hereinafter be used to designate the main valve closing direction as the case may be.

The pilot valve 45 is shaped generally cylindrical and supported at a portion thereof adjacent to an end portion 63 located on X1 side in the axial directions by the coupling cylinder member 29 via a bearing member 64 for displacement in the axial directions X1 and X2. In this condition, the pilot valve 45 has an opposite end portion 55 located on X2 side in the axial directions which is loosely fitted in the cylindrical portion 50 of the main valve 44.

The end portion 55 of the pilot valve 45 which is located on X2 side in the axial directions defines a coupling hole 56 extending therethrough perpendicularly to the axis of the pilot valve 45 (which is coincident with the reference axis L10). The cylindrical portion 50 of the main valve 44 has a shaft-shaped coupling member 57 extending perpendicularly to the axis of the main valve 44 (which is coincident with the reference axis L10). The coupling member 57 is loosely fitted through the coupling hole 56 to couple the pilot valve 45 to the main valve 44. The pilot valve 45 in this condition is displaceable in the axial directions X1 and X2 relative to the main valve 44.

The end portion 55 of the pilot valve 45 which is located on side X2 in the axial directions and the cylindrical portion 50 of the main valve 44 define therebetween a clearance which forms a pilot path 52. The bottom portion 51 of the main valve 44 defines a valve bore 60 extending along the reference axis L10. Further, a pilot valve seat 61 is formed so as to circumscribe an opening of the valve bore 60 which is open to the inside of the cylindrical portion 50.

The pilot valve 45 is displaceable between a pilot valve closed position in which a pilot valve seat portion 62 formed at the end portion 55 located on side X2 in axial directions is pressed on the pilot valve seat 61 and a pilot valve open position in which the pilot valve seat portion 62 is spaced apart from the pilot valve seat 61 in a pilot valve opening direction from the pilot valve closed position toward the pilot valve open position and in a pilot valve closing direction from the pilot valve open position toward the pilot valve closed position.

When in the pilot valve closed position, the pilot valve 45 closes the pilot path 52 to shut off connection between the pilot path 52 and the valve bore 60. When in the pilot valve open position, the pilot valve 45 opens the pilot path 52 to establish connection between the pilot path 52 and the valve bore 60.

Since the pilot valve opening direction is the same as the axial direction X1, the same reference character X1 will hereinafter be used to designate the pilot valve opening direction as the case may be. Similarly, since the pilot valve closing direction is the same as the axial direction X2, the same reference character X2 will hereinafter be used to designate the pilot valve closing direction as the case may be.

The moving core 46 comprises a ferromagnetic material and is shaped generally columnar. The moving core 46 has a guide portion 66 located on side X1 in the axial directions and an outer peripheral path forming portion 67 located on side X2 in the axial directions. The guide portion 66 defines an axial path 68 extending in the axial directions X1 and X2 along the axis thereof (which is coincident with the reference axis L10) and opening toward the axial direction X1. The outer peripheral path forming portion 67 forms an outer peripheral path 69 extending on the outer periphery of the moving core 46 in the axial directions X1 and X2 and opening toward the axial direction X2. Further, the moving core 46 defines a connection path 72 connecting the axial path 68 and the outer peripheral path 69 to each other.

The moving core 46 is fitted between the fixed magnetic pole member 26 and the coupling cylinder member 28. With the moving core 46 in this condition, the guide portion 66 is fitted in the non-magnetic guide member 27. The moving core 46 and the magnetic guide member 28 define therebetween a clearance that is larger than that between the moving core 46 and the non-magnetic guide member 27. The moving core 46 is supported by the non-magnetic guide member 27 so as to be displaceable in the axial directions X1 and X2.

The pilot valve 45 and the moving core 46 are joined to each other mechanically by thread engagement or the like. The pilot valve 45 and the moving core 46 thus joined together integrally are displaceable as an integral structural component. In this case, the structural component is supported by two members, namely, the bearing member 64 supporting the pilot valve 45 and the non-magnetic guide member 27 supporting the moving core 46, whereby the structural component can be displaced smoothly under high-precision guiding.

The coil 17, which is electromagnetic drive means, produces magnetic force to drive the valve 16 for displacement when energized, or applied with electric power. The coil 17 is a solenoid coil having its axis coinciding with the reference axis L1 and covering at least a part of the fixed magnetic pole member 26 and at least a part of the moving core 46 from a radially outward direction. Specifically, the coil 17 is fitted in the coil chamber 34 of the casing member 25 of the first housing section 21 and held inside the housing 21.

When energized, the coil 17 magnetizes both the fixed magnetic pole member 26 and the moving core 46 to produce a magnetic attraction force working therebetween in the axial directions X1 and X2, thus urging the fixed magnetic pole member 26 and the moving core 46 toward each other. Thus, the coil 17 drives the moving core 46 for displacement in the axial direction X1 toward the fixed magnetic pole member 26 forming a part of the housing 15. By displacement of the moving core 46, the pilot valve 45 is driven for displacement in the pilot valve opening direction X1, which causes the main valve 44 coupled to the pilot valve 45 to be driven for displacement in the main valve opening direction X1. Accordingly, the coil 17 drives the valve 16 for displacement in the opening direction X1.

The driving spring member 18 forming elastic pressing means drives the valve 16 for displacement by utilizing its spring force which is an elastic recovery force. The driving spring member 18 is a compression coil spring having its axis coinciding with the reference axis L10 and accommodated in the valve chest space 200 so as to fit around the pilot valve 45.

The pilot valve 45 is formed with a radially outwardly protruding flange-shaped spring seat lug 70 located between the main valve 44 and the coupling cylinder member 29. Also, the coupling cylinder member 29 is formed with a spring seat portion 71. The driving spring member 18 has an end portion that is located on side X1 in the axial directions and supported by the spring seat portion 71 of the coupling cylinder member 29, and an opposite end portion that is located on side X2 in the axial directions and supported by the spring seat lug 70 of the pilot valve 45.

The driving spring member 18 applies the pilot valve 45 with a spring force working in the axial direction X2. Accordingly, the driving spring member 18 can drive the pilot valve 45 together with the moving core 46 for displacement in the pilot valve closing direction X2, namely, the axial direction X2, thus causing the main valve 44 coupled to the pilot valve 45 to be driven for displacement in the main valve closing direction X2. Therefore, the driving spring member 18 drives the valve 16 for displacement in the closing direction X1. The driving power of the driving spring member 18 is smaller than that of the coil 17.

Figure 3:
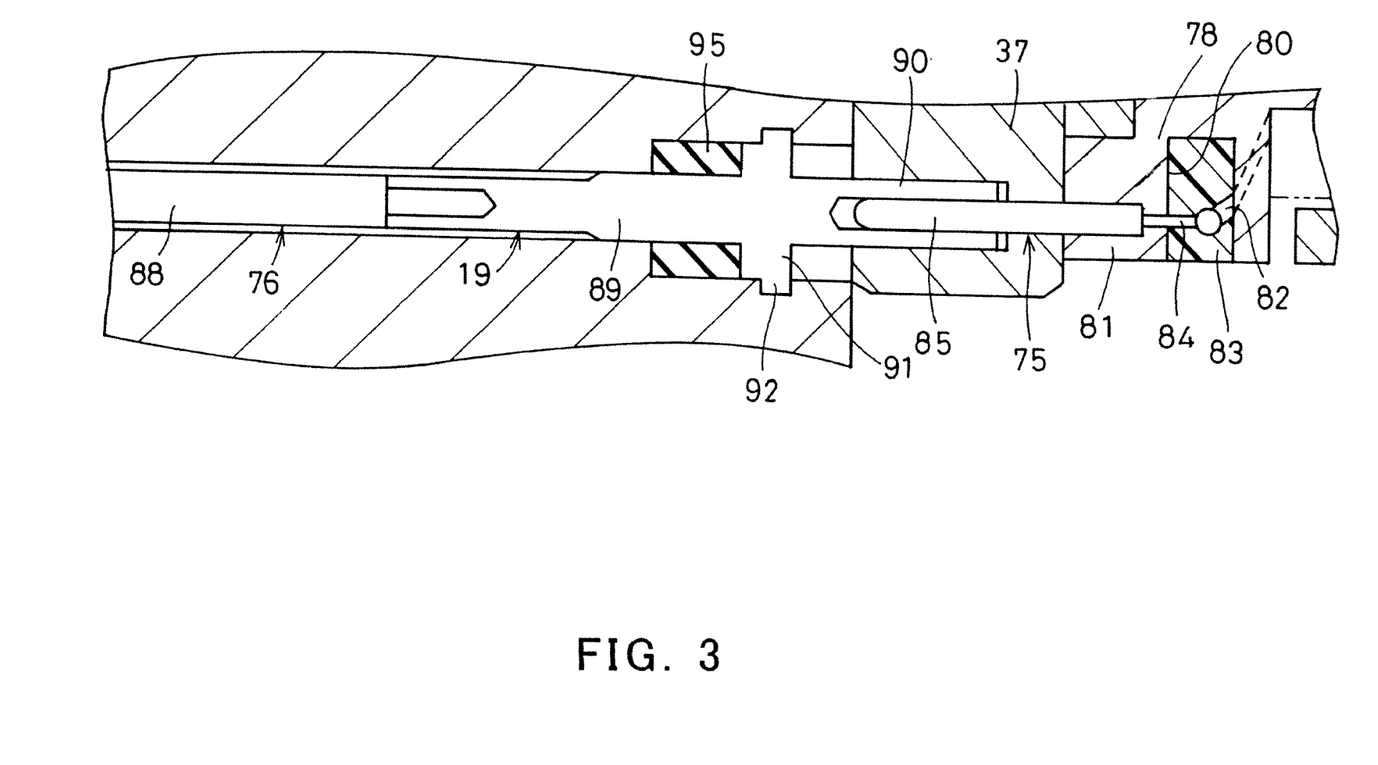
FIG. 3 is an enlarged cross-sectional view showing an electric conductor wire of the electromagnetic on-off valve shown in FIG. 1.

FIG. 3 is an enlarged cross-sectional view showing the electric conductor wire 19 and its periphery shown in FIG. 1. Reference will be made of FIG. 3 together with FIG. 1. The electric conductor wire 19 forming electric conductor means supplies electric power to the coil 17. The electric conductor wire 19 is held by the housing 15 so as to extend inside the housing 15 from a portion of the housing 15 that is exposed from the tank 11, namely, the portion exposed to the tank external space 13 to a portion of the housing 15 that accommodates the coil 17, namely, the coil chamber 34.

Stated otherwise, the electric conductor wire 19 is connected to the coil 17, extends inside the housing 15 without being exposed to the tank internal space 12 as well as to the valve chest space 43, and is drawn out into the tank external space 13. The electric conductor wire 19 is formed when the first and second electric conductor pieces 75 and 76 held by respective of the first and second housing sections 21 and 22 are connected to each other.

The first electric conductor piece 75 is held by the first housing section 21. More specifically, the first electric conductor piece 75 is held at a flange portion (hereinafter will be referred to as "holding flange") 78 of the coil bobbin member 31 that is located on side X2 in the axial directions in the casing member 25. The holding flange 78 is formed with a recess 80 for accommodating a connecting portion (hereinafter will be referred to as "connection recess"), and a terminal portion of a winding 82 forming the coil 17 is drawn out into the connection recess 80.

The first electric conductor piece 75 is realized by a terminal pin comprising an electrically conductive material and has a step portion 83. A portion 84 of the first electric conductor piece 75 that is located on side X1 in the axial directions has a smaller outside diameter than a portion 85 of the first electric conductor piece 75 that is located on side X2 in the axial directions. With the step portion 83 positioned inside a portion (hereinafter will be referred to as "holding portion") 81 of the holding flange 78 located on side X2 in the axial directions relative to the connection recess 80, the first electric conductor piece 75 extends through the holding portion 81 in the axial directions X1 and X2. Thus, the first electric conductor piece 75 is held at the holding portion 81 so that its displacement in the axial direction X1 is inhibited assuredly.

The portion 84 of the first electric conductor piece 75 that is located on side X1 in the axial directions has an end portion protruding into the connection recess 80 where that end portion is electrically connected to the terminal portion of the winding 82 forming the coil 17 by soldering, welding or the like. With the electrical connection thus made, the connection recess 80 is filled with a filler 83 comprising a synthetic resin to protect the connection between the first electric conductor piece 75 and the winding 82. The end portion 85 of the first electric conductor piece 75 which is located on side X2 in the axial directions protrudes from the holding portion 78 toward the axial direction X2.

The second electric conductor piece 76 has a lead wire 88 comprising an electrically conductive material, and a terminal socket 89 comprising an electrically conductive material, the terminal socket 89 being electrically connected to one end of the lead wire 88. The second electric conductor piece 76 extends through the second housing section 22 in the axial directions X1 and X2 with its terminal socket 89 positioned on side X1 in the axial directions. With the first and second housing sections 21 and 22 joined to each other, the second electric conductor piece 76 is positioned opposite in the axial direction X1 and X2, and to the terminal pin 85 forming the first electric conductor piece.

The terminal socket 89 has a cylindrical fit portion 90 at its end portion located on side X1 in the axial directions opposite away from the side connected to the lead wire 88, and a radially outwardly protruding flange-shaped engagement portion 91 located on side X2 in the axial directions relative to the fit portion 90. The terminal socket 89 has a portion located on side X1 in the axial directions which is partially protruding from the second housing section 22 toward the axial direction X1. The terminal socket 89 is engagingly secured to the second housing section 22 by fitting an outer peripheral portion 92 of the engagement portion 91 into an annular engagement recess 93 formed in the second housing section 22. Accordingly, displacement of the terminal socket 89 in the axial direction X2 is inhibited.

The terminal pin 75 forming the first electric conductor piece has the portion protruding from the holding portion 81 toward the axial direction X2, which portion is inserted into a spacer 37. Also, the second electric conductor piece 76 has the portion of the terminal socket 89 protruding from the second housing 22, which portion is inserted into the spacer 37. Within this spacer 37, the terminal pin 75 is partially inserted into the fit portion 90 of the terminal socket 89 so as to be resiliently caught by the fit portion 90. In this way, the first and second electric conductor pieces 75 and 76 are connected to each other mechanically and electrically.

The first and second housing sections 21 and 22 are joined together in such a manner that the insert member 24 is first joined to the second housing section 22 and then the casing member 25 is brought close to the second housing section 22 so as to fit over the insert member 24. In thus joining the first and second housing sections 21 and 22 together, the first and second housing sections 21 and 22 previously holding respective of the first and second electric conductor pieces 21 and 22 prevent the terminal pin 75 and the terminal socket 89 from being displaced in the axial direction X1 and the axial direction X2, respectively; that is, displacements of the terminal pin 75 and the terminal socket 89 are inhibited against the force exerted to insert the terminal pin 75 into the terminal socket 89. For this reason, the terminal pin 75 can be inserted into the terminal socket 89 to establish connection between the first and second electric conductor pieces 75 and 76 with the joining of the first and second housing sections 21 and 22 together.

An annular seal member 95 comprising an O-ring for example is provided as circumscribing a portion of the terminal socket 89 that is located on side X2 in the axial directions relative to the engagement portion 91 in order to seal the clearance between the terminal socket 89 and the second housing section 22 hermetically. The provision of the seal member 95 prevents leakage of gas from between the housing 15 and the electric conductor wire 19 easily even though the electric conductor wire 19 is located inside the housing 15. The seal member 95 is located in the space which the engagement portion 91 of the terminal pin 89 and a part of the second housing 22 face from the axial direction X1 and the axial direction X2, respectively. For this reason, in inserting the terminal pin 75 into the terminal socket 89, the terminal socket 89 receives a force working in such a direction as to cause the space accommodating the seal member 95 to contract, that is, in such a direction as to enhance the sealing performance. Thus, a high sealing capability is realized.

Referring again to FIG. 1, the electromagnetic on-off valve 10 is fitted on the tank 11 by inserting the portion of the electromagnetic on-off valve 10 that is located on side X1 in the axial directions into the tank internal space and bringing an external thread engaging the outer peripheral portion of the second housing section 22 into engagement with the tank 11. In this way, the electromagnetic on-off valve 10 is fitted on the tank 11 with its major components, such as the valve 16 and the coil 17, positioned inside the tank 11.

The coupling cylinder member 29 of the electromagnetic on-off valve 10 defines a bypass path 99 extending therethrough in the axial directions X1 and X2. In the housing 15, there are provided: a primary-side section including the primary path 39, axial path 68, connection path 72, outer peripheral path 69 and bypass path 99; an on-off section including the main path 59, pilot path 52 and valve bore 60; a secondary-side section including the secondary path 40; and the valve path 43 connecting the primary port 41 and the second port 42 to each other. The valve path 43 has an on-off portion associated with two path systems, one including the main path 59, the other including the pilot path 52 and the valve bore 60.

When electric power supply to the coil 17 is stopped, the valve 16 is driven toward the closing direction X2 by the spring force of the driving spring member 18 to assume the closed position. Specifically, the main valve 44 and the pilot valve 45 are in the main valve closed position and the pilot valve closed position, respectively. Thus, both of the main path 59 and the pilot path 52, i.e., both of the aforementioned two path systems, are closed. With the valve path 43 thus closed to shut off connection between the primary port 41 and the secondary port 42, the electromagnetic on-off valve 10 is in the closed condition which prevents gas residing in the tank internal space 12 from being outputted into the tank external space 13.

When electric power is supplied to the coil 17 through the electric conductor member 19, the coil 17 produces a magnetic force which causes both of the moving core 46 and the pilot valve 45 to be displaced in the pilot valve opening direction X1. Thus, the pilot path 52 is opened to establish connection between the primary port 41 and the secondary port 42, thereby allowing gas to be outputted into the tank external space 13.

At that time, the main valve 44 receives a primary pressure working in the main valve closing direction X2 which is the pressure of gas led from the tank internal space 12 to the primary port 41 as well as a secondary pressure working in the main valve opening direction X1 which is the pressure of gas led from the tank external space 13 to the secondary port 42. The effective primary pressure receiving area for effectively receiving the primary pressure is equal to the effective secondary pressure receiving area for effectively receiving the secondary pressure. Immediately after the pilot valve 45 has been driven for opening, the difference between the primary pressure and the secondary pressure is so large that the main valve 44 receives a gas pressure driving force working in the main valve closing direction X2 as a resultant force of the primary and secondary pressures. The magnetic force produced by the coil 17 cannot resist the gas pressure driving force and, hence, the main valve 44 remains in the main valve closed position. In this way, the pilot valve 45 is first driven for opening by the coil 17 in order to output primary-pressure gas at a high pressure through the pilot path 52 opened.

As the output of gas proceeds in that manner, the secondary pressure increases gradually and, hence, the difference between the primary and secondary pressures decreases gradually. Since the gas pressure driving force is thus lessened, the magnetic force produced by the coil 17 becomes able to resist such a gas pressure driving force, thus causing the main valve 44 coupled to the pilot valve 45 to be displaced in the main valve opening direction X1. Accordingly, the main path 59 is opened to allow gas to be outputted into the tank external space 13 through the main path 59 as well as the pilot path 52. By such a two-step operation, the valve 16 is opened to bring the magnetic on-off valve 10 into its open condition.

When the electric power supply to the coil 17 is stopped with the magnetic on-off valve 10 in the open condition, the valve 16 is displaced in the closing direction X2 by the spring force of the driving spring member 18 to resume the closed position. In this way, the electromagnetic on-off valve 10 opens and closes the valve path 43, thereby making it possible to control the output of gas from the tank internal space 12.

In the electromagnetic on-off valve 10 according to the present embodiment, electric power is supplied to the coil to drive the valve 16 for displacement by a magnetic action, thereby adjusting the opening of the valve path 43.

The electric power for thus driving the valve 16 is supplied to the coil 17 through the electric conductor wire 19. The electric conductor wire 19 extends from the portion of the housing 15 which is exposed from the tank 11 to the portion of the housing 15 which accommodates the coil 17 therein. Thus, the housing 15 holds the electric conductor wire 19 as extending inside the housing 15. Since the electric conductor wire 19 is held by the housing 15 so as to extend therein, the electric conductor wire 19 is protected against vibration and impact given thereto from the outside. Thus, the electric conductor wire 19 is imparted with enhanced reliability in terms of resistance to vibration and impact and, hence, the electromagnetic on-off valve 10 has enhanced reliability. With the electric conductor wire 19 thus positioned within the housing 15, the housing 15 can house the electric conductor wire 19 neatly. This makes it possible to simplify the operation of assembling the electromagnetic on-off valve 10 and render the electromagnetic on-off valve 10 compact. Thus, the present invention can provide such a highly reliable and compact electromagnetic on-off valve 10.

The electric conductor wire 19 comprises plural electric conductor pieces. According to the present embodiment, the electric conductor wire 19 comprises the first and second electric conductor pieces 75 and 76 which are held by respective of the first and second housing sections 21 and 22 forming the housing 15. When the housing sections 21 and 22 are joined together, the electric conductor pieces 75 and 76 become connected to each other. Thus, the electric conductor wire 19 can be positioned in the housing 15 comprising the housing sections 21 and 22 joined together without need to perform the operation of connecting the electric conductor pieces 75 and 76 to each other separately from the operation of joining the housing sections 21 and 22 together. Therefore, the electromagnetic on-off valve 10 having improved assemblability can be realized which is small in size and requires a simple assembling operation.

The pin-shaped end portion is inserted into the socket-shaped end portion, so that the pin-shaped end portion is resiliently caught by the socket-shaped end portion. By so doing, the electric conductor pieces 75 and 76 are connected to each other. Since the connection between the electric conductor pieces 75 and 76 can be made in this manner, it is possible to realize the electric conductor wire 19 which can formed with the joining of the housing sections 21 and 22 together. Therefore, such a simple operation as to join the housing sections 21 and 22 together makes it possible to connect the electric conductor pieces 75 and 76 to each other at the same time, thus improving the assemblability.

The seal member 95 intervenes between the housing 15 and the electric conductor wire 19. The provision of the seal member 95 makes it possible to prevent leakage of gas through between the housing 15 and the electric conductor wire 19. Thus, the present invention can realize the advantageous electromagnetic on-off valve 10. Also, the terminal socket 89 has an outer peripheral surface formed with a relatively thick insulating film which ensures electrical insulation from the second housing section 22 and enhances the sealing performance by improved intimate contact with the seal member.

Also, the primary port 41 is formed at the end portion of the housing 15 which is located in the axial directions X1 and X2 and positioned in the tank internal space 12. With the primary port thus formed at the end portion of the housing 15, it is possible to reduce limitations on designing to open the primary port in the tank internal space 12 as compared with cases where the primary port is formed at an intermediate portion of the housing 15 in the axial directions X1 and X2 so as to open toward a direction intersecting the reference axis L10. This arrangement can make the electromagnetic on-off valve 10 compact.

Further, the solenoid case 30 of the housing 15 has an open hole 100 which is open to the external space of the housing 15, or the tank internal space 12 according to the present embodiment. The open hole 100 serves to equalize the pressure in the coil chamber 34 to the external pressure, thereby preventing an undesired external force from being exerted on the coil 17. Thus, the electromagnetic on-off valve 10 has enhanced reliability.

It should be noted that the foregoing embodiment is only illustrative of the present invention and may be modified in structure and arrangement within the scope of the present invention.

INDUSTRIAL APPLICABILITY

The magnetic valve device according to the present invention is applicable to pressure equipment, such as high-pressure gas equipment, which calls for an electromagnetic valve device having high reliability and rendered compact.

The invention claimed is:

1. An electromagnetic valve device to be incorporated in pressure equipment using a pressure fluid with a portion thereof exposed from the pressure equipment, the electromagnetic valve device comprising:
   a housing formed with a primary port and a secondary port which are connected to each other through a valve path;
   a displaceable valve configured to vary an opening of said valve path by displacement thereof;
   electromagnetic drive means operative to drive said valve for displacement by a magnetic action caused by utilization of electric power; and
   electric conductor means for supplying electric power to said electromagnetic drive means, said electric conductor means being held by said housing so as to extend inside said housing from the portion of said housing that is exposed from the pressure equipment to another portion of said housing that accommodates said electromagnetic drive means therein, wherein:
   said housing comprises a plurality of housing sections joined together, the plurality of housing sections arranged to be joinable to one another by moving the housing sections in a predetermined direction parallel to an axis;
   said electric conductor means comprises electric conductor pieces connected to each other, each of which is held by a respective one of said housing sections;
   said electric conductor pieces are connected to each other with an operation of joining said housing sections together;
   wherein said electric conductor pieces include a first electric conductor piece having a pin-shaped end portion and a second electric conductor piece having a socket-shaped end portion, said pin-shaped end portion being caught resiliently by said socket-shaped end portion when said pin-shaped end portion is inserted into said socket-shaped end portion, the first electrical conductor piece extending from a first one of the housing sections in a linear direction parallel to the axis, the second electrical conductor piece mounted to a second one of the housing sections such that the pin-shaped end portion of the first conductor piece is insertable into the socket-shaped end portion of the second conductor piece along the predetermined direction and parallel to the axis;
   wherein the second electric conductor piece includes a flange portion;
   a seal means disposed in the housing and operatively engaged by the flange portion, the seal means disposed toward a low pressure side of the valve device relative to the flange portion; and
   wherein the first electric conductor piece includes a connecting portion connected to the electromagnetic drive means, and including a filling material filled around the connecting portion to protect the connecting portion.

2. The electromagnetic valve device according to claim 1, wherein:
   at least said housing, said valve and said electromagnetic drive means are coaxially arranged along a predetermined reference axis; and
   said primary port is formed at an axial end portion of said housing that is located in directions along said reference axis and positioned inside the pressure equipment.

3. An electromagnetic valve device to be incorporated in pressure equipment using a pressure fluid with a portion thereof exposed from the pressure equipment, the electromagnetic valve device comprising:
   a housing formed with a primary port and a secondary port which are connected to each other through a valve path;
   a displaceable valve configured to vary an opening of said valve path by displacement thereof;
   electromagnetic coil device arranged to drive said valve for displacement by a magnetic action caused by utilization of electric power; and
   an electric conductor arranged to supply electric power to the electromagnetic coil device, the electric conductor being held by said housing so as to extend inside said housing from the portion of said housing that is exposed from the pressure equipment to another portion of said housing that accommodates said electromagnetic coil device therein, wherein:

said housing comprises a first housing section and a second housing section joinable to one another, the first and second housing sections arranged to be joinable to one another by moving the housing sections relative to one another in a predetermined direction parallel to an axis;

said electric conductor comprises a first electric conductor piece having a terminal pin, and a second electric conductor piece operatively coupled to a terminal socket, the terminal socket having a receptacle portion, the terminal pin sized to be received in the terminal socket;

the first electric conductor piece disposed in the first housing section and extending from the first housing section in a linear direction parallel to the axis, the second electric conductor piece disposed in the second housing section such that the pin-shaped end portion of the first conductor piece is insertable into the socket-shaped end portion of the second conductor piece along the predetermined direction and parallel to the axis; and wherein the first and second electric conductor pieces and the terminal socket are connected to one another upon joining the first and second housing sections to one another to thereby form a continuous electrical connection across the first electric conductor piece, the terminal socket, and the second electric conductor piece;

wherein the second electric conductor piece includes a flange portion arranged for placement within the second housing section;

a seal means operatively engaged by the flange portion, the seal means disposed in the second housing section and disposed toward a low pressure side of the valve device relative to the flange portion; and wherein the first electric conductor piece includes a connecting portion connected to the electromagnetic drive means, and including a filling material filled around the connecting portion to protect the connecting portion.

4. The electromagnetic valve device according to claim 3, wherein:

the terminal pin of the first electric conductor piece is caught resiliently by the terminal socket of the second electric conductor piece when the terminal pin is inserted into the terminal socket.

5. The electromagnetic valve device according to claim 3, wherein:

at least said housing, said valve and said electromagnetic coil device are coaxially arranged along a predetermined reference axis; and said primary port is formed at an axial end portion of said housing that is located in directions along said reference axis and positioned inside the pressure equipment.

* * * * *